US012790251B2

(12) United States Patent
Mohr et al.

(10) Patent No.: US 12,790,251 B2
(45) Date of Patent: Nov. 10, 2026

(54) DIRECT LOADING OF GLASS GOBS INTO TRAVERSABLE BLANK MOLDS

(71) Applicant: Owens-Brockway Glass Container Inc., Perrysburg, OH (US)

(72) Inventors: Paul B. Mohr, Waterville, OH (US); John Holmes-Libbis, Perrysburg, OH (US); Bernhard Altendorfer, Waldkirchen (DE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 394 days.

(21) Appl. No.: 17/981,139

(22) Filed: Nov. 4, 2022

(65) Prior Publication Data

US 2023/0148131 A1 May 11, 2023

Related U.S. Application Data

(60) Provisional application No. 63/276,210, filed on Nov. 5, 2021.

(51) Int. Cl.
*C03B 7/00* (2006.01)
*C03B 7/08* (2006.01)

(52) U.S. Cl.
CPC ................ *C03B 7/005* (2013.01); *C03B 7/08* (2013.01)

(58) Field of Classification Search
None
See application file for complete search history.

(56) References Cited

U.S. PATENT DOCUMENTS

| | | | | |
|---|---|---|---|---|
| 1,684,064 | A | 9/1928 | Miller | |
| 1,902,140 | A * | 3/1933 | Rowe | C03B 9/165 65/214 |
| 3,206,296 | A * | 9/1965 | Mennitt | C03B 9/165 65/357 |
| 3,623,856 | A | 11/1971 | Keller | |
| 4,046,550 | A * | 9/1977 | Thyoux | C03B 9/1936 65/237 |

(Continued)

FOREIGN PATENT DOCUMENTS

| | | |
|---|---|---|
| CL | 200000242 A1 | 2/2001 |
| CN | 101910072 A | 12/2010 |

(Continued)

OTHER PUBLICATIONS

CN 108388084 machine translation, Nagashima, Juichi, Exposure device, Aug. 2018 (Year: 2018).*

(Continued)

*Primary Examiner* — Queenie S Dehghan

(57) ABSTRACT

A glass forming individual section machine includes a machine frame having a glass gob loading axis, a traversable blank side, including a blank mold configured to form a glass gob into a parison and having a blank mold vertical axis, and a mold carriage movably carried on the machine frame and coupled to the traversable blank side to linearly translate the traversable blank side toward the glass gob loading axis to align the blank mold vertical axis with the glass gob loading axis and to linearly translate the traversable blank side away from the glass gob loading axis. A related method of loading a blank mold of an individual section machine is also disclosed.

23 Claims, 17 Drawing Sheets

(56) References Cited

U.S. PATENT DOCUMENTS

| | | | | |
|---|---|---|---|---|
| 4,200,449 | A * | 4/1980 | Martin | C03B 9/3645 65/300 |
| 4,205,973 | A | 6/1980 | Ryan | |
| 4,273,568 | A | 6/1981 | Scholl et al. | |
| 5,931,982 | A | 8/1999 | Gottlieb | |
| 6,684,665 | B1 | 2/2004 | Bogert et al. | |
| 7,350,379 | B2 | 4/2008 | Ueda et al. | |
| 7,827,826 | B2 | 11/2010 | Tijerina-Ramos et al. | |
| 8,047,022 | B2 | 11/2011 | Cramer | |
| 8,375,743 | B2 | 2/2013 | Zanella et al. | |
| 9,731,991 | B2 | 8/2017 | Dalstra | |
| 9,950,941 | B2 | 4/2018 | Johnston | |
| 10,435,322 | B2 | 10/2019 | Dalstra | |
| 2014/0109618 | A1* | 4/2014 | Kuz | C03B 9/1938 65/80 |
| 2017/0121207 | A1 | 5/2017 | Tanaka et al. | |
| 2018/0201537 | A1 | 7/2018 | Valli et al. | |
| 2020/0156982 | A1 | 5/2020 | Thacker | |

FOREIGN PATENT DOCUMENTS

| | | | | |
|---|---|---|---|---|
| CN | 105948463 | A | 9/2016 | |
| CN | 211255679 | U | 8/2020 | |
| DE | 10312550 | B3 | 7/2004 | |
| EP | 0245800 | A1 * | 11/1987 | C03B 9/3858 |
| EP | 2447224 | B1 | 5/2012 | |
| EP | 2356081 | B1 | 5/2019 | |
| EP | 3549920 | A1 | 10/2019 | |
| FR | 2243417 | | 4/1975 | |
| JP | H0585754 | A | 4/1993 | |
| JP | 2002274858 | A | 9/2002 | |
| JP | 2009196892 | A | 9/2009 | |
| JP | 2012506364 | A | 3/2012 | |
| JP | 5784497 | B2 | 9/2015 | |
| JP | 5923542 | B2 | 5/2016 | |
| JP | 6325230 | B2 | 5/2018 | |
| MX | 338830 | B | 5/2016 | |
| RU | 2534308 | C2 | 11/2014 | |
| WO | WO2016181071 | A1 | 11/2016 | |
| WO | 2018019402 | A1 | 2/2018 | |
| ZA | 201103235 | B | 1/2012 | |

OTHER PUBLICATIONS

KR 100530272 machine translation, Lee, Inspection apparatus for LCD glass, Nov. 2005 (Year: 2005).*

JP H0585754 machine translation, Matsui, Tadashi, Glass Forming Apparatus, Apr. 1993 (Year: 1993).*

Chinese First Office Action with English translation, Application No. 202280069547.X, Applicant: Owens-Brockway Glass Container Inc., Dated: Jan. 15, 2025.

NPL Machine Translation of CN101910072.

NPL Machine Translation of CN105948463.

NPL Machine Translation of CN211255679.

PCT Search Report and Written Opinion, Int. Application No. PCT/US2022/049000, Int. Filing Date: Nov. 4, 2022, Applicant: Owens-Brockway Glass Container Inc.

Chinese 2nd Office Action, Application No. 202280069547.X, Filing Date: Nov. 4, 2022, Applicant: Owens-Brockway Glass Container Inc., Dated: Jul. 10, 2025.

Chinese Second Office Action, Application No. 202280069547.X, Filing Date: Apr. 15, 2024, Dated Jul. 10, 2025.

Chile Informe De Busqueda (Search Report), Application No. 202401272, Applicant: Owens-Brockway Glass Container Inc., Dated: Oct. 13, 2025.

Chile Informe De Pericial (Expert Report), Application No. 202401272, Applicant: Owens-Brockway Glass Container Inc., Dated: Oct. 13, 2025.

Chinese 3rd Office Action with English translation, Application No. 202280069547.X, Dated: Oct. 29, 2025.

Japanese Office Action, Application No. 2024-521876, Title: Direct Loading of Glass Bobs into Traversable Blank Molds, Applicant: Owens-Brockway Glass Container Inc., Dated: Feb. 8, 2026.

Japanese Office Action with English translation, Patent Application No. 2024-521876, Examiner Masayuki Wakatsuchi, Dated Aug. 13, 2026.

* cited by examiner

DIRECT LOADING OF GLASS GOBS INTO TRAVERSABLE BLANK MOLDS

TECHNICAL FIELD

This patent application discloses innovations related to glass container manufacturing and, more particularly, loading glass gobs fed from a gob feeder into blank molds.

BACKGROUND

Soda-lime-silica glass and other types of glass are prevalent in the manufacture of glass containers. Molten glass used to make such articles can be conventionally prepared by reacting and melting a batch of glass-forming materials in a glass furnace. The batch of glass-forming materials is typically introduced into the furnace by being deposited into a pool of molten glass already in the furnace. The batch is gradually melted into the pool by continuous application of heat. After the batch has been melted, refined, and homogenized within the furnace, the resulting molten glass is typically directed to a fining channel where bubbles are liberated from the molten glass and then downstream to a forehearth where the fined molten glass is thermally conditioned by being cooled to a suitable temperature for forming the molten glass into containers. A gob feeder located at a downstream end of the forehearth can be used to measure out and form predetermined amounts of molten glass known as "gobs." The gobs are fed from the gob feeder, down into and through "delivery" equipment, and to an "individual section" (IS) machine that forms the glass gobs into parisons and then forms the parisons into glass containers.

A conventional IS machine typically includes two to sixteen individual sections of identical construction positioned side-by-side in a row and configured to be operated out of phase with one another to provide a continuous flow of glass containers on a conveyor downstream of the IS machine. Each section includes a frame supporting a blank sub-section or side to receive or load one or more glass gobs from the delivery equipment and form one or more parisons from the glass gobs, and a blow sub-section or side to receive parisons from the blank side and form containers from the parisons. The blank side includes one or more blank molds, plungers, funnels, and baffles that form the glass gobs into the parisons, and corresponding blank mold actuators, plunger actuators, funnel actuators, baffle actuators, and other devices and components that facilitate operation of the blank molds, plungers, and baffles. The blow side includes one or more blow molds, bottom plates, and blow heads that form the parisons into the containers, and corresponding blow mold actuators, bottom plate pneumatics, and blow head actuators. Each section also includes mold cooling circuits and valves, and a parison inverter including parison neck rings carried by an invert arm to hold the parisons by their necks and invert the parisons from the blank molds to the blow molds. Each section further includes a takeout mechanism to take the containers out of the blow molds and release them onto a deadplate of each section, and a sweepout mechanism that sweeps the containers from the deadplate to the downstream conveyor. The aforementioned equipment of each section is operated according to precise timing to ensure that the IS machine as a whole provides the continuous flow of glass containers onto the downstream conveyor.

In operation, movable halves of each of the blank molds are closed around the plungers with the funnels located on top of the blank molds, gobs are delivered through the funnels into the molds, the baffles are placed on top of the funnels, and air is puffed through the baffles to settle the gobs down into the blank molds. Then, the funnels and the baffles are removed, the baffles are replaced directly on top of the blank molds, and either counterblow air is puffed through blow plungers to blow the gobs into conformity with the blank molds (blow-and-blow) or press plungers are advanced into the blank molds to press the gobs into conformity with inner surfaces of the blank molds (press-and-blow). The baffles have exhaust reliefs to allow air to escape from the blank molds during formation of the parisons. Thereafter, the baffles are removed, the molds are opened, and the parison inverters rotate to invert the parisons from a "necks-down" orientation in the blow molds to a "necks-up" orientation between upper ends of open movable halves of the blow molds of the blow side. Subsequently, the movable halves of the blow molds close around the bottom plates, the parison inverter rotates back to the blank side to a position between lower ends of the open blank molds, and the blow heads are placed on top of the closed blow molds to blow air into the parisons through their open necks to blow the parisons into conformity with inner surfaces of the blow molds to produce the containers. Finally, the blow heads are removed, the blow molds are opened, the takeout mechanism relocates the finished containers from the blow side to the deadplate and the sweepout mechanism sweeps the finished containers from the deadplate to the downstream conveyor. Notably, the finished containers are very hot and, therefore, must be of sufficient wall thickness that they do not slump when placed on the deadplate or when traveling down the conveyor as they cool.

The gob feeder typically controls temperature and quantity of molten glass of the glass gobs and a rate at which the glass gobs are fed to the IS machine indirectly via the delivery equipment. But the delivery equipment requires use of dirty lubricants and includes a complex arrangement of scoops, troughs, and deflectors of varying lengths and configurations, depending on proximity of each section of the IS machine to the gob feeder. Use of such messy and variable delivery equipment contributes to variation in temperature distribution of the glass gobs and, therefore, such temperature variation leads to undesirable non-uniform wall thicknesses of glass containers produced from the glass gobs and, thus, such non-uniformity necessitates use of container wall thicknesses that are greater than would otherwise be required.

SUMMARY OF THE DISCLOSURE

The present disclosure embodies a number of aspects that can be implemented separately from or in combination with each other.

A glass forming individual section machine in accordance with one aspect of the disclosure includes a machine frame having a glass gob loading axis, and a traversable blank side, including a blank mold configured to form a glass gob into a parison and having a blank mold vertical axis. The machine also includes a mold carriage movably carried on the machine frame and coupled to the traversable blank side to linearly translate the traversable blank side toward the glass gob loading axis to align the blank mold vertical axis with the glass gob loading axis and to linearly translate the traversable blank side away from the glass gob loading axis.

In accordance with another aspect of the disclosure, there is provided a method of loading a blank mold of an individual section machine, including producing a falling glass gob along a falling gob axis, moving at least one traversable blank side including at least one blank mold along an axis transverse to the falling gob axis to load the glass gob substantially along a first loading axis of the at least one blank mold, and forming the glass gob into a parison using the at least one blank mold.

DETAILED DESCRIPTION

In general, and in accordance with at least one aspect of the present disclosure, an apparatus, system, and method are provided for loading a glass gob directly into a blank mold, preferably with no intervening delivery equipment in the form of scoops, troughs, and/or deflectors. Accordingly, the apparatus, system, and method do not necessitate delivery equipment that requires messy lubrication and that is lengthy and involves prolonged contact between glass gobs and the delivery equipment, and thereby leads to glass gob deformation and uneven cooling of the glass gobs. Therefore, the apparatus, system, and method do not require a large height difference between the glass feeder and the corresponding blank mold and the temperature distribution of each glass gob is more uniform thereby leading to more uniform wall thicknesses of glass containers produced from the glass gobs and, thus, thinner-walled lighter-weight containers can be produced. In accordance with another aspect of the disclosure, an apparatus, system, and method are provided for autonomous loading of a glass gob into a blank mold. Accordingly, the apparatus, system, and method should not require operator intervention after initial system set up.

Figure 1:
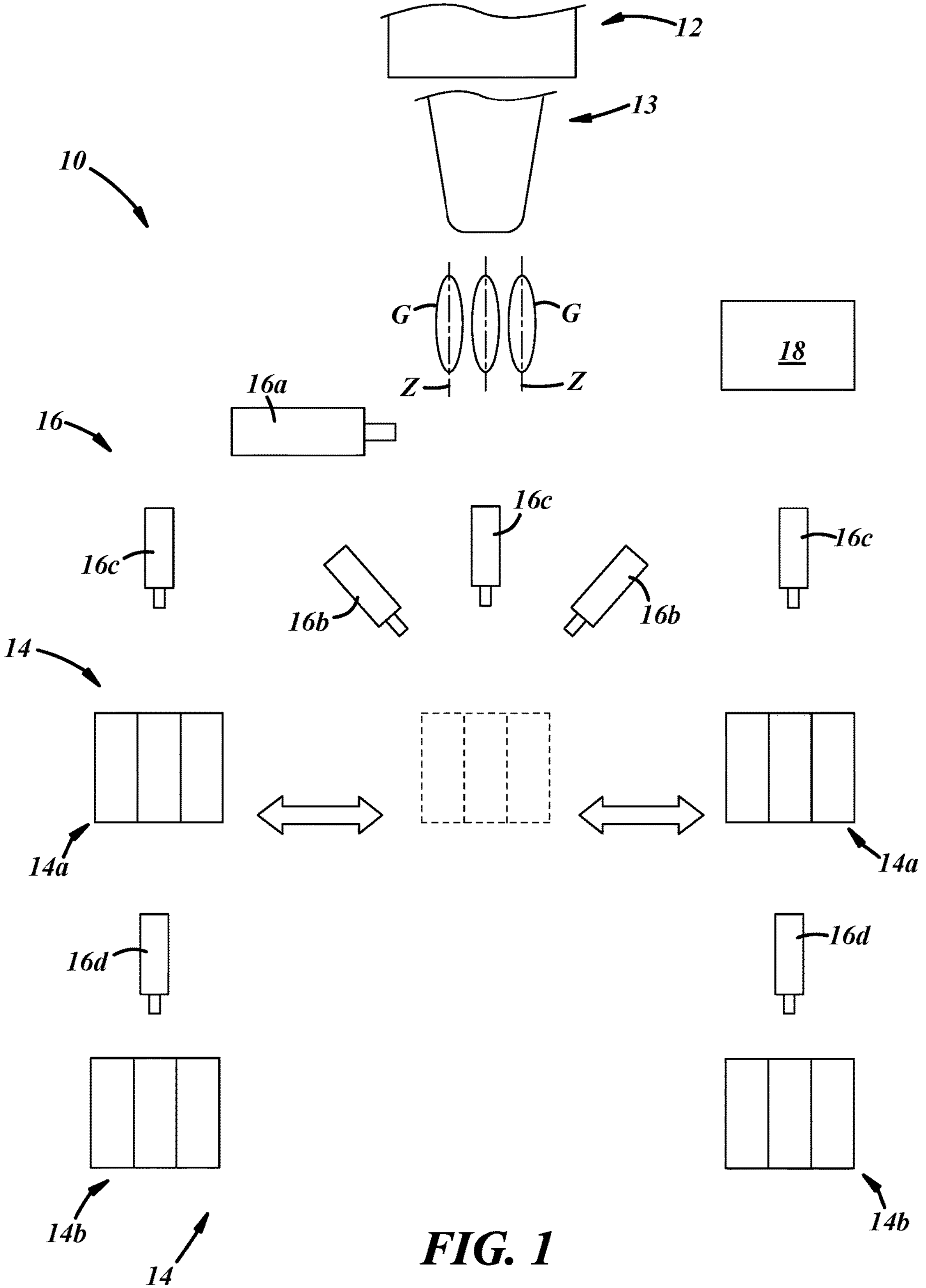
FIG. 1 shows a schematic view of a glass container manufacturing system including a glass gob feeder, an individual section (IS) machine including traversable blank sides and stationary blow sides, and a sensor subsystem including one or more falling gob sensors, gob loading sensors, and blow mold temperature sensors, in accordance with an illustrative embodiment of the present disclosure.
Figure 2:
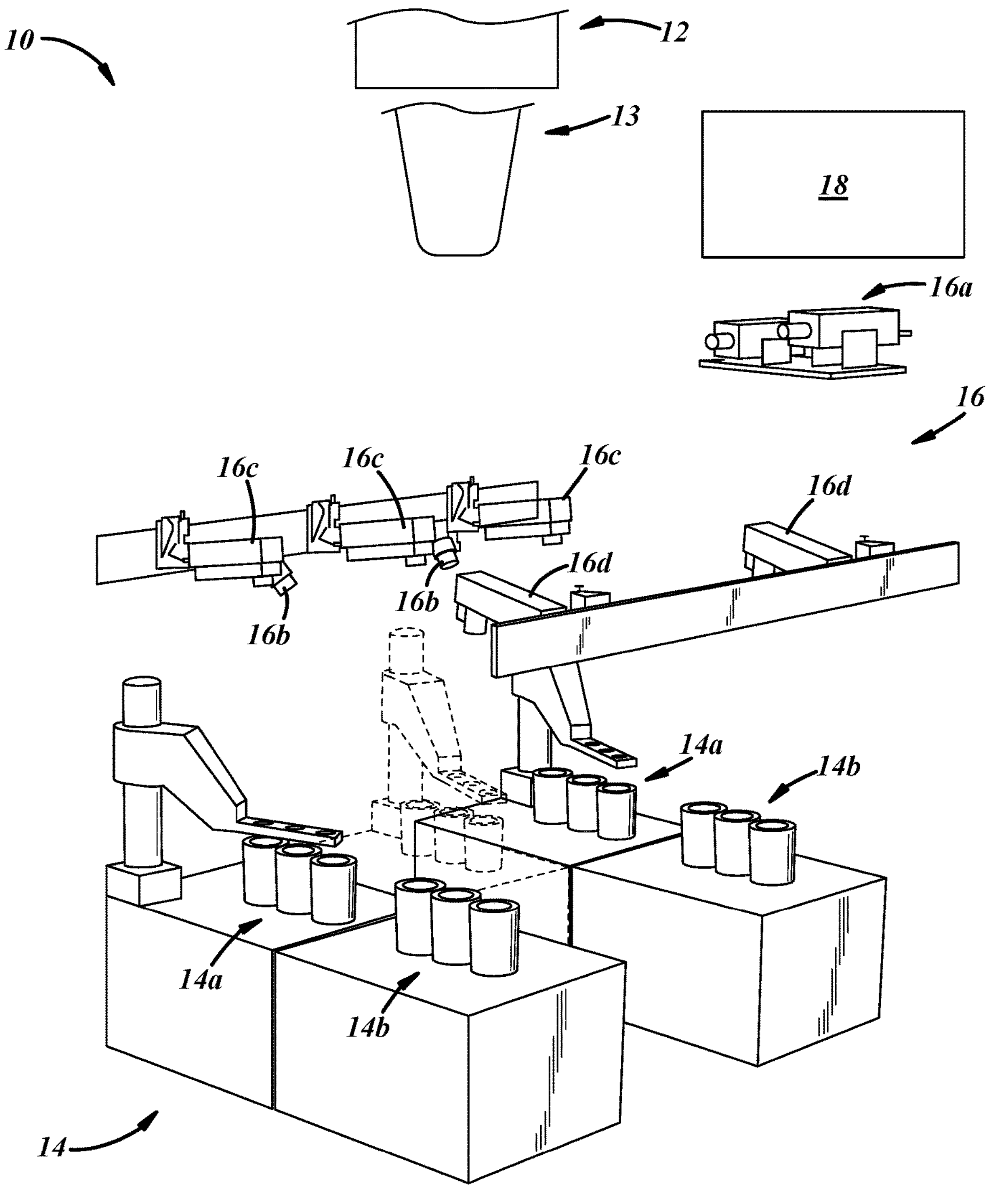
FIG. 2 shows a more detailed perspective schematic view of the system of FIG. 1.
Figure 3:
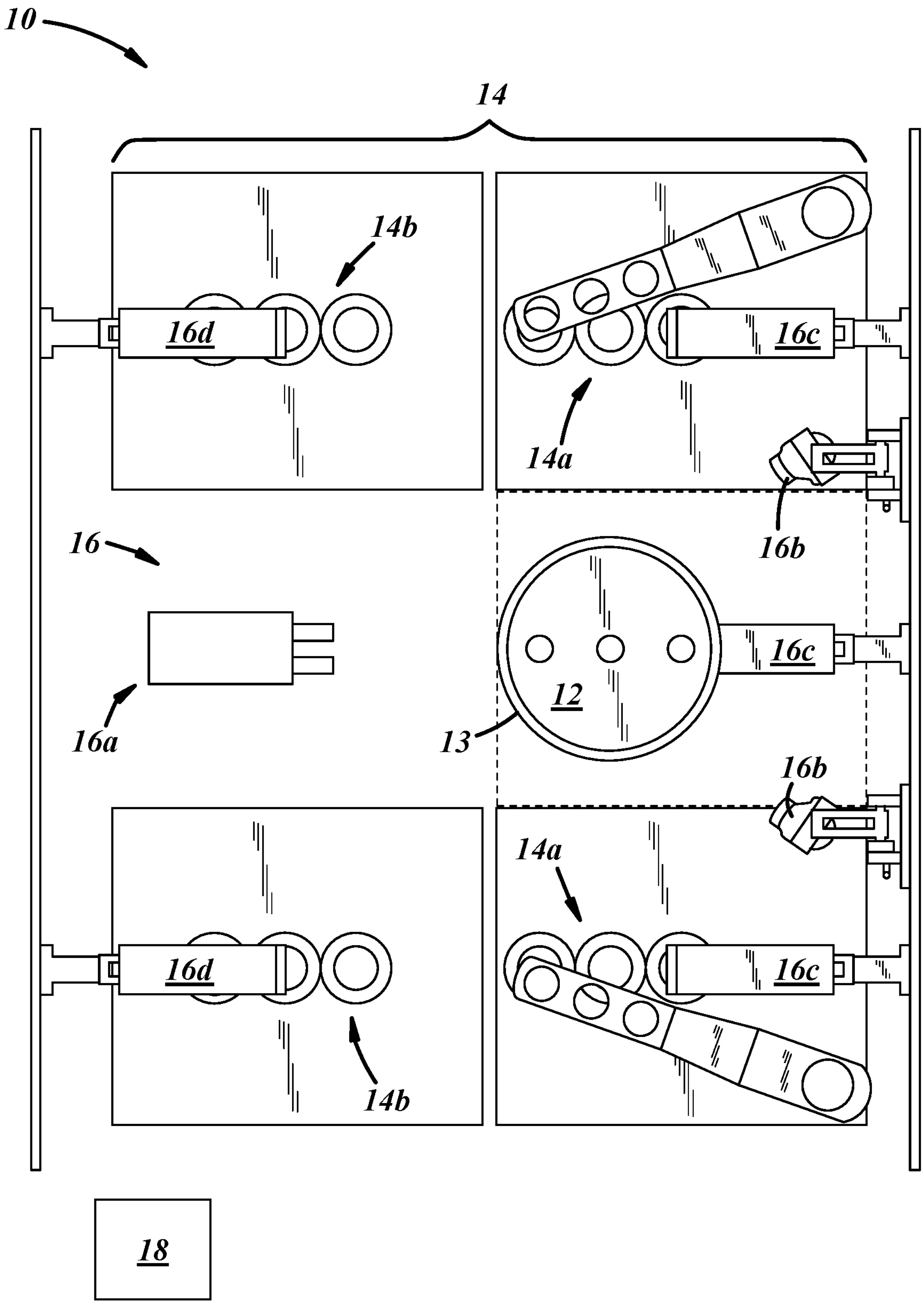
FIG. 3 shows a more detailed schematic top view of the system of FIG. 1.

With specific reference to the drawing figures, FIGS. 1 through 3 generally show an illustrative embodiment of a system 10 that includes a gob feeder 12 to produce one or more glass gobs G that fall along gob feeding or falling axes Z corresponding to each of the gobs G, a glass forming individual section (IS) machine 14 below the gob feeder 12 to receive or load the falling gobs G into traversable blank molds 14*a* and ultimately produce glass containers (not shown) from the glass gobs G via stationary blow molds 14*b*. Although the system 10 is illustrated according to a triple gob and triple mold setup, those of ordinary skill in the art would recognize that the system 10 may be configured for a single gob and single mold setup, a dual gob and dual mold setup, or according to any suitable gob and mold quantity. The system 10 also may include a sensor subsystem 16, and further may include a controller 18 to receive input signals from the sensor subsystem 16 and the IS machine 14, process the input signals in any suitable manner, and transmit output signals to the IS machine 14 and/or the gob feeder 12 to improve loading of the glass gobs G to the IS machine 14. The sensor subsystem 16 may include one or more falling gob sensors 16*a*, gob loading sensors 16*b*, blank mold temperature sensors 16*c*, and blow mold temperature sensors 16*d*.

Preferably, the system 10 includes no gob delivery equipment in the form of scoops, troughs, and/or deflectors between the gob feeder 12 and the IS machine 14 to change direction of the falling gobs G away from falling gob axes Z. However, a gob shaping funnel 13 may be placed between the gob feeder 12 and the IS machine 14. Notably, a primary purpose of the gob shaping funnel 13 is to promote a desired shape of the glass gobs G produced by the gob feeder 12 and, perhaps, also to also maintain a trajectory of the falling gobs G along the falling gob axes Z and, to the contrary, not to redirect the glass gobs G away from the falling gob axes Z as is done with prior art funnels, and conventional delivery equipment in the form of scoops, troughs, and/or deflectors. A loading height between a glass line (or "metal line") of a glass melting apparatus and a top of an individual section machine bed can be reduced compared to conventional arrangements that use delivery equipment in the form of scoops, troughs, and/or deflectors. Such conventional equipment typically requires a conventional loading height of about 6 meters to achieve a velocity of a gob that is sufficient to fully load the gob into a blank mold. In contrast, because there is little to no surface contact on gobs G falling between the gob feeder 12 and blank molds 14*a* of the IS machine 14 according to the present disclosure, the gobs G can achieve velocity sufficient to fully load the gobs G into the blank molds 14*a* according to a reduced loading height of about 3 meters. As used herein, the term "about" means within plus or minus 15%.

Although not separately shown, the gob feeder 12 may include a feeder channel to receive molten glass from an upstream forehearth and convey the molten glass downstream, a feeder bowl or chamber downstream of the feeder channel to receive the molten glass, an orifice at a downstream end of the feeder chamber to define a shape of glass gobs G produced by the feeder, a plunger including a plunger rod to push molten glass toward and out of the orifice and a plunger actuator to move the plunger rod, a heating system including one or more heaters to heat one or more of the feeder channel, chamber, and/or orifice, and a gob cutter downstream below the orifice to cut gobs from a stream of molten glass exiting the orifice. In some embodiments, the gob feeder 12 also may include a plunger tube and a plunger tube actuator. The gob cutter may include mechanical devices like shears, optical devices like lasers, fluid devices like water jets, or any other device suitable to cut a gob from a glass stream.

Figure 4:
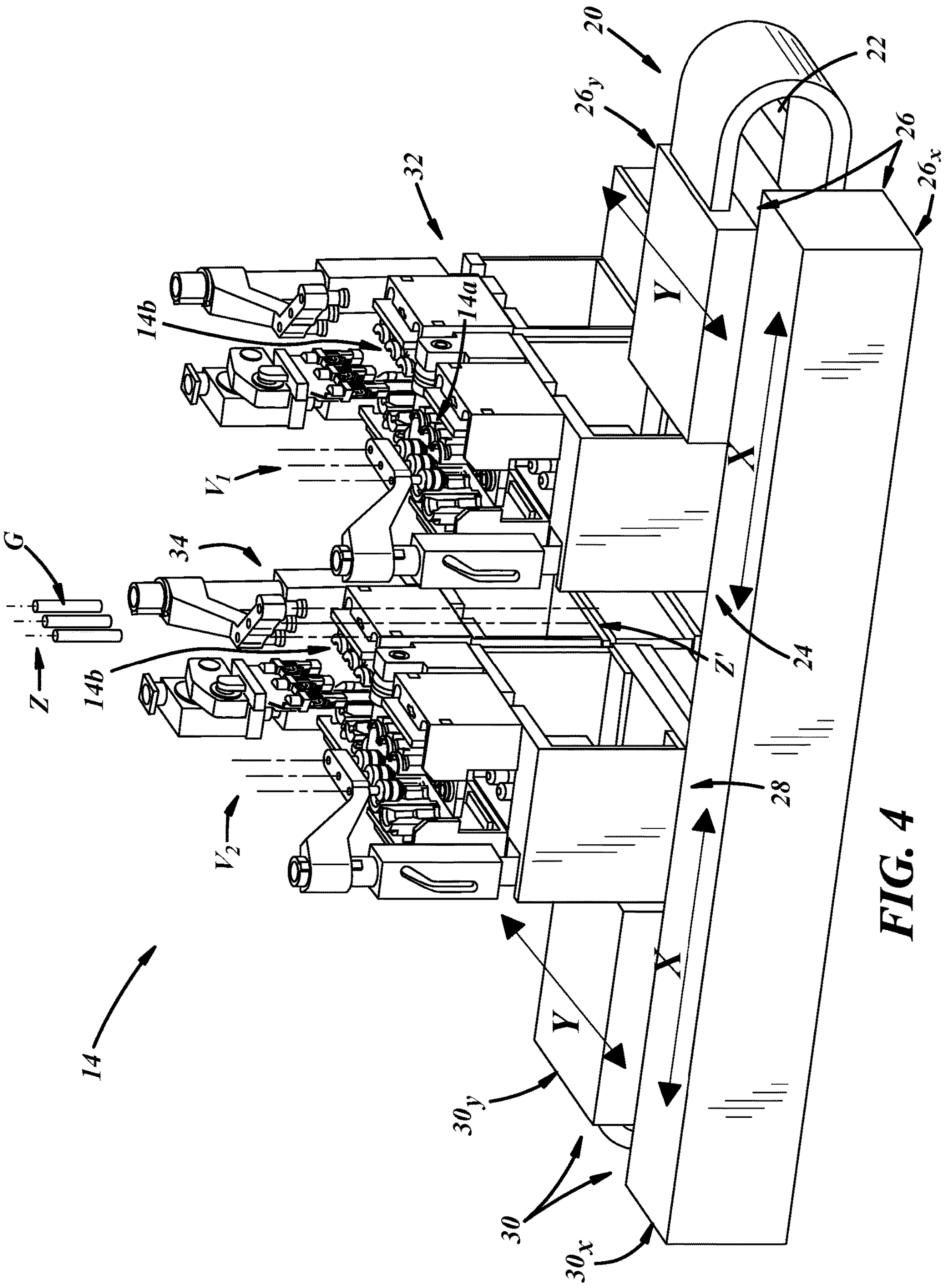
FIG. 4 shows a further more detailed perspective schematic view of a portion of the system of FIG. 1, including the gob feeder and the IS machine with the blank sides shown in molding positions.

With reference now to FIG. 4, the IS machine 14 has a glass gob receiving or loading axis Z' and includes a machine frame 20 including a machine platen 22, a traversable blank side 24, including at least one blank mold 14*a* configured to form a glass gob into a parison and having a blank mold vertical axis $V_1$, and a mold carriage 26 movably carried on the machine frame 20 and coupled to the traversable blank side 24 to linearly translate the traversable blank side 24 toward the glass gob loading axis Z' to align the blank mold vertical axis $V_1$ with the glass gob loading axis Z' and to linearly translate the traversable blank side 24 away from the glass gob loading axis Z'. Further, the IS machine 14 additionally may include a second traversable blank side 28 including at least one second blank mold 14*a* configured to form a glass gob into a parison and having a second blank mold vertical axis $V_2$ and a second mold carriage 30 carried on the machine frame 20 and coupled to the second traversable blank side 28 to linearly translate the second traversable blank side 28 toward the glass gob loading axis Z' to align the second blank mold vertical axis $V_2$, with the glass gob loading axis Z' and to linearly translate the second traversable blank side 28 away from the glass gob loading axis Z'. Also, the IS machine additionally may include a stationary blow side 32, including at least one blow mold 14*b* configured to form a container from the parison produced by the blank mold(s) 14*a*. Moreover, the IS machine additionally may include a second stationary blow side 34, including at least one second blow mold 14*b* configured to form a container from the parison produced by the second blank mold(s) 14*a* of the second traversable blank side 28.

Figure 5:
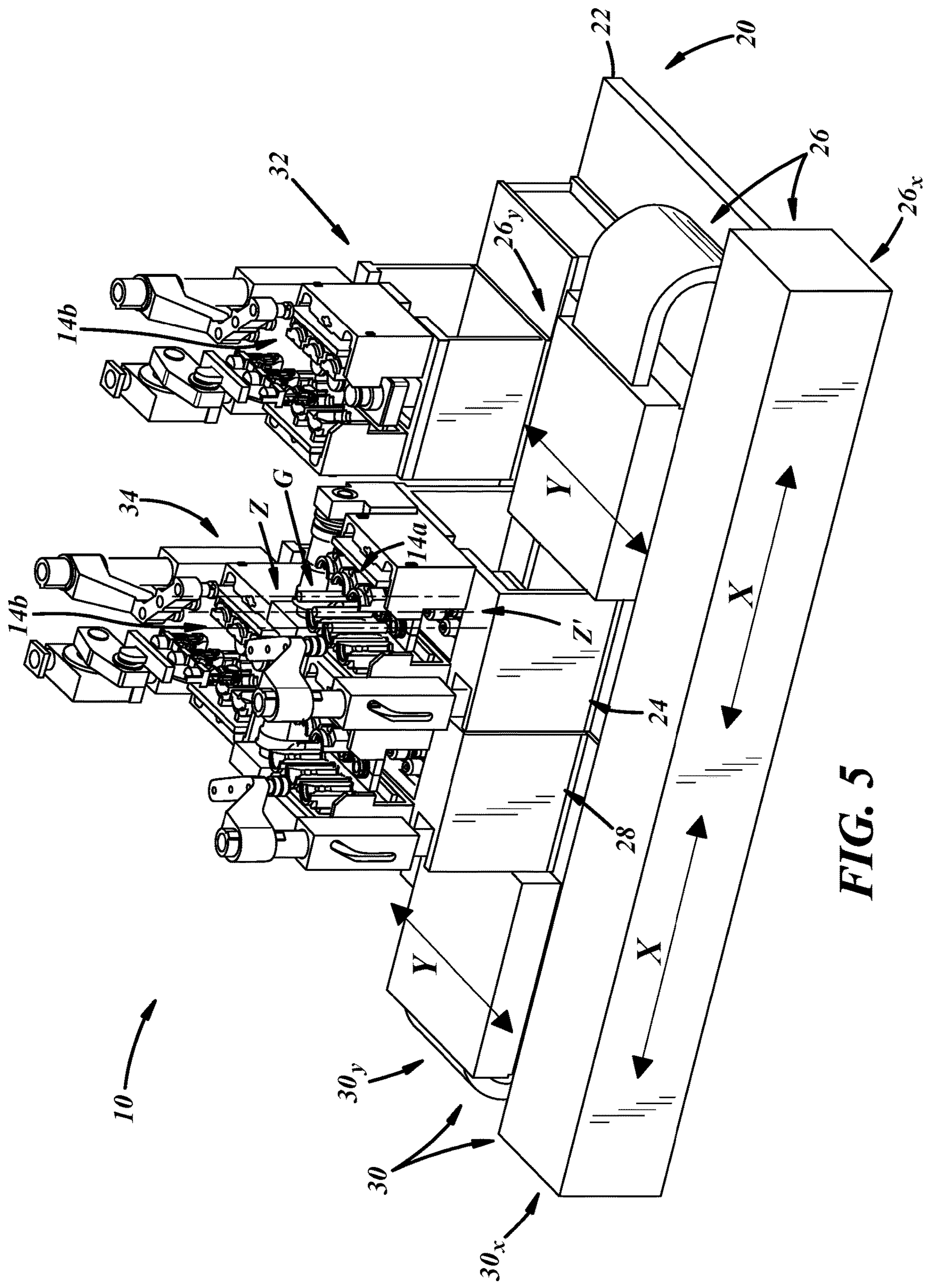
FIG. 5 shows the portion of the system shown in FIG. 4, wherein one of the traversable blank sides has been moved from its molding position of FIG. 4 to a gob loading position directly beneath the gob feeder.

With reference to FIGS. 4 and 5, the mold carriages 26, 30 include carriage first stages 26*x*, 30*x* movable along a longitudinal first axis X, and may also include at least one other stage, for example, carriage second stages 26*y*, 30*y*, movable along a lateral second axis Y transverse to the first axis X. Accordingly, the traversable blank sides 24, 28 are movable along the longitudinal axis X from a molding position (FIG. 4) on one side of the falling gob axis Z toward the falling gob axis Z to a loading position (FIG. 5) wherein a loading axis Z' of the blank mold(s) 14*a* is axially aligned with the falling gob axis Z, and then back again to the molding position. The traversable blank sides 24, 28 also may be movable along the second axis Y transverse to the longitudinal axis X, as will be discussed in further detail herein below. In any case, the blank sides 24, 28 may be paused momentarily to receive or load the glass gob(s) into the blank mold(s) 14*a* to ensure desired accuracy and position of gob loading.

The presently illustrated arrangement includes two traversable blank sides 24, 26 disposed on orthogonally opposite longitudinal sides of the loading axis Z'. But the presently disclosed subject matter includes any suitable quantity of blank sides disposed in any suitable arrangement with respect to the axis Z', for example, three blank sides that may be circumferentially spaced apart around the axis, for instance, 120 angular degrees apart, or four blank sides that may be orthogonally arranged around the axis, for instance, 90 angular degrees apart.

Figure 6:
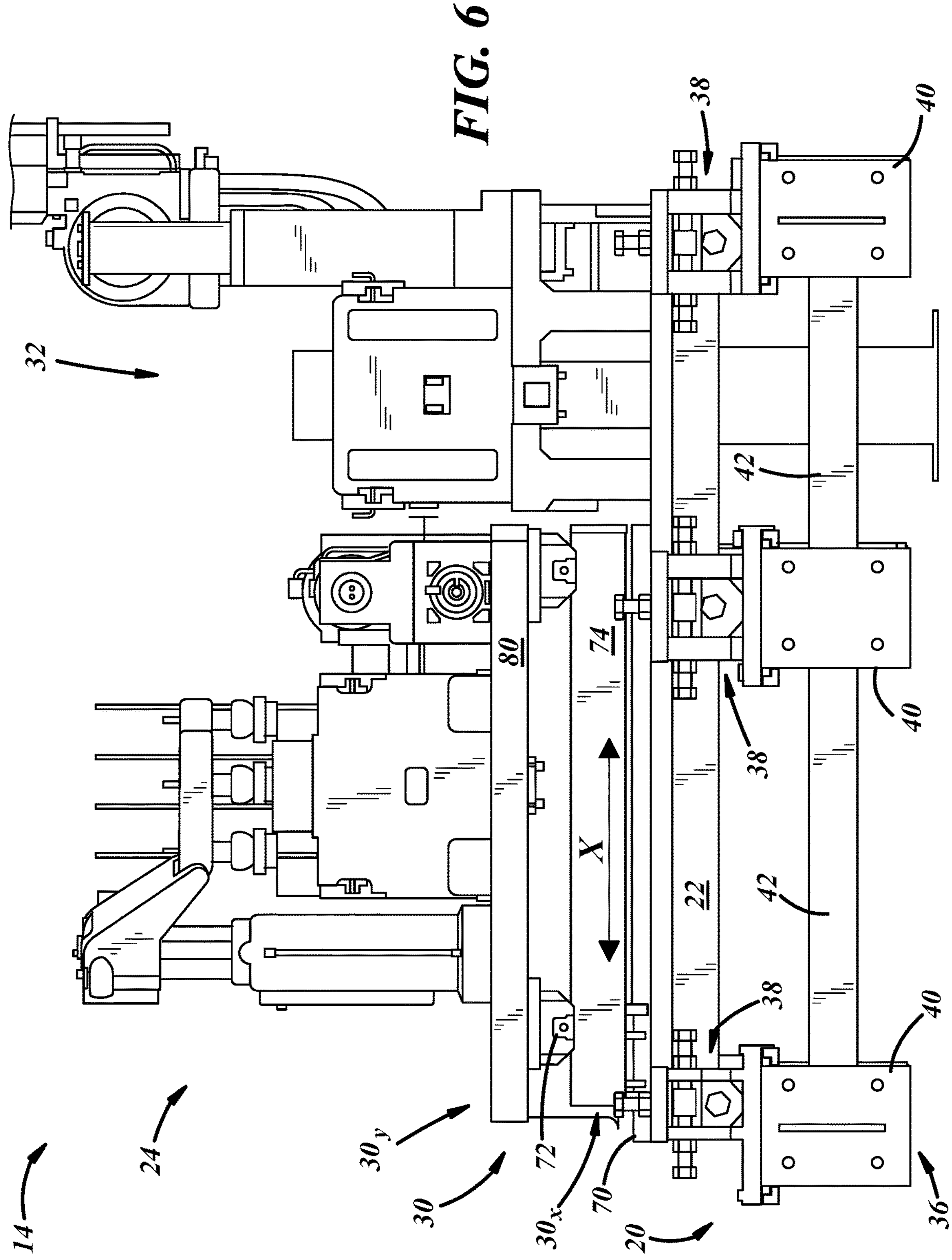
FIG. 6 shows an elevational end view of the portion of the system of FIG. 4.

With reference to FIG. 6, the machine frame 20 also includes a base 36, the machine platen 22, and adapter mounts 38 coupled to the base 36 and carrying the machine platen 22. The base 36 may include a plurality of beams 40 extending longitudinally and being laterally spaced apart from one another and one or more cross-members 42 extending laterally between and connecting to the plurality of beams 40. Of course, the base 36 may be of any other construction suitable for supporting a machine platen thereon with the adapter mounts 38 carried therebetween. Although not separately shown, the machine frame 20 also may include additional adapter mounts in the form of levelers axially sandwiched between the base 36 and the machine platen 22 to level the machine platen 22 relative to the base 36. The levelers may include opposed wedges that may be driven toward and away from one another to raise and lower the machine platen 22 relative to the base 36.

Figure 7A:
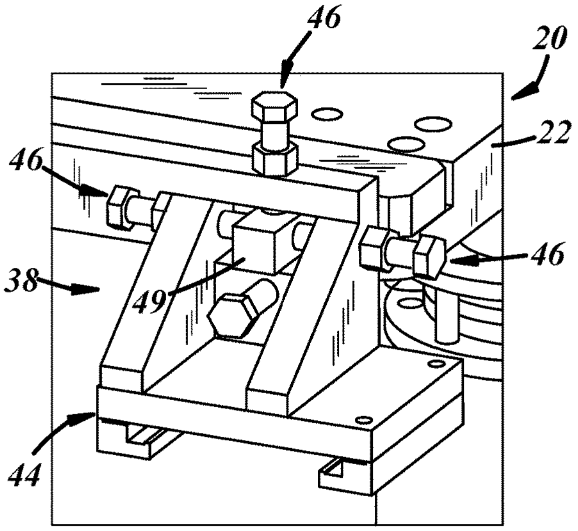
FIGS. 7A through 7D show a perspective view, a top view, a side view, and an end view of a machine platen positioner of the individual section machine of FIG. 6.
Figure 7B:
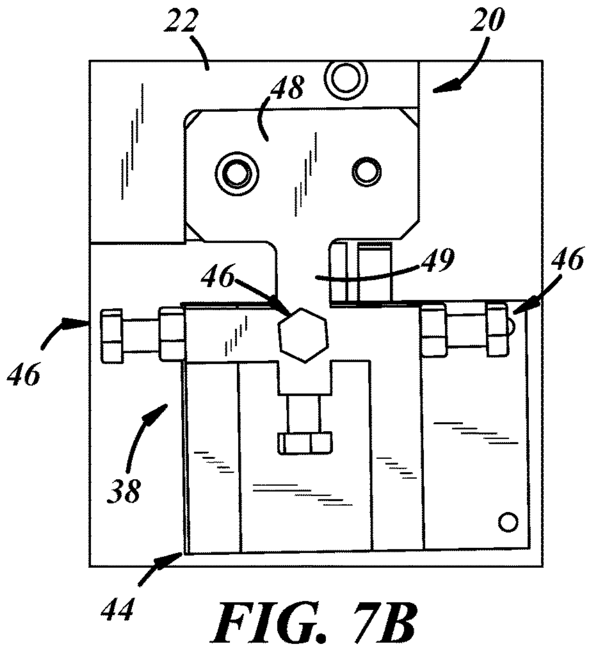
Figure 7C:
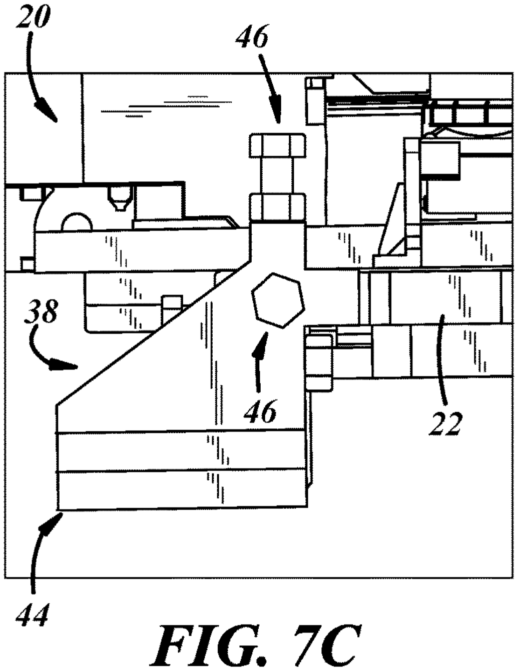
Figure 7D:
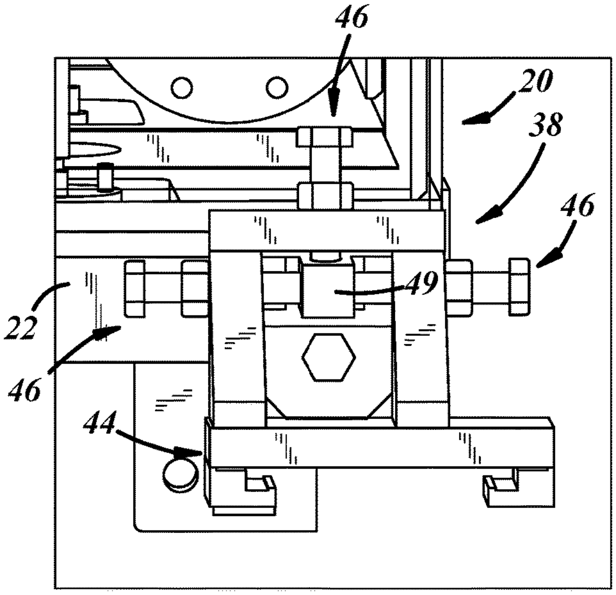

With reference to FIGS. 7A through 7D, the illustrated adapter mounts 38 are in the form of platen positioners, for example, at one or more corners of the machine frame 20, to position the machine platen 22 relative to the base (not shown) in a plurality of directions. The positioners may include bracketry 44 fixed to the base (not shown), and one or more set screws 46 threaded through the bracketry 44 and coupled to one or more portions of the machine platen 22 to push or pull the machine platen 22 in one or more directions. As illustrated, and as best shown in FIG. 7B, the machine platen 22 may include one or more inserts 48 fastened to a main portion of the platen 22 and having a driven projection or tang 49 extending outwardly from the main portion of the platen 22 to cooperate with the set screws 46.

Figure 8:
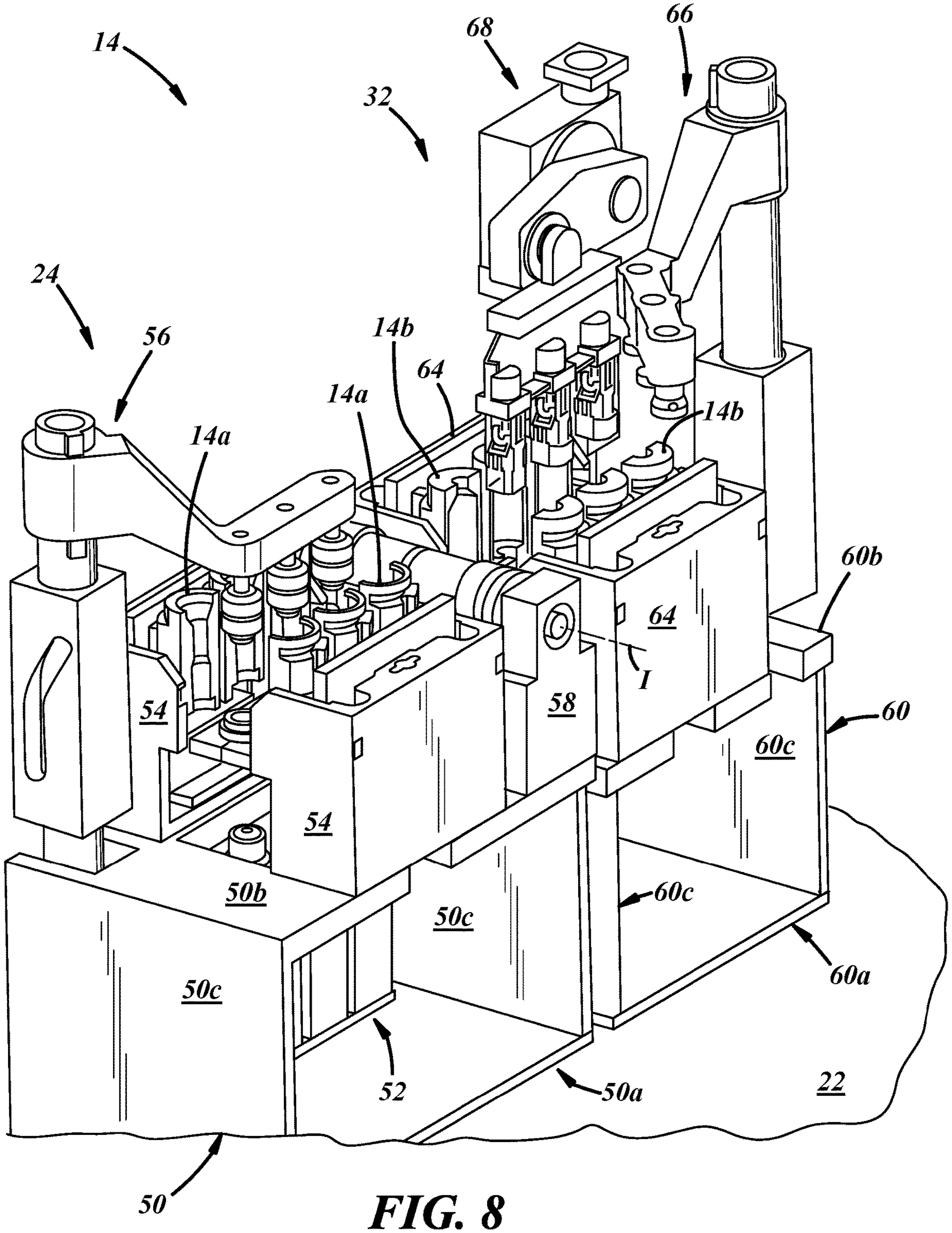
FIG. 8 shows one of the traversable blank sides and one of the stationary blow sides of the system of FIG. 4.
Figure 9:
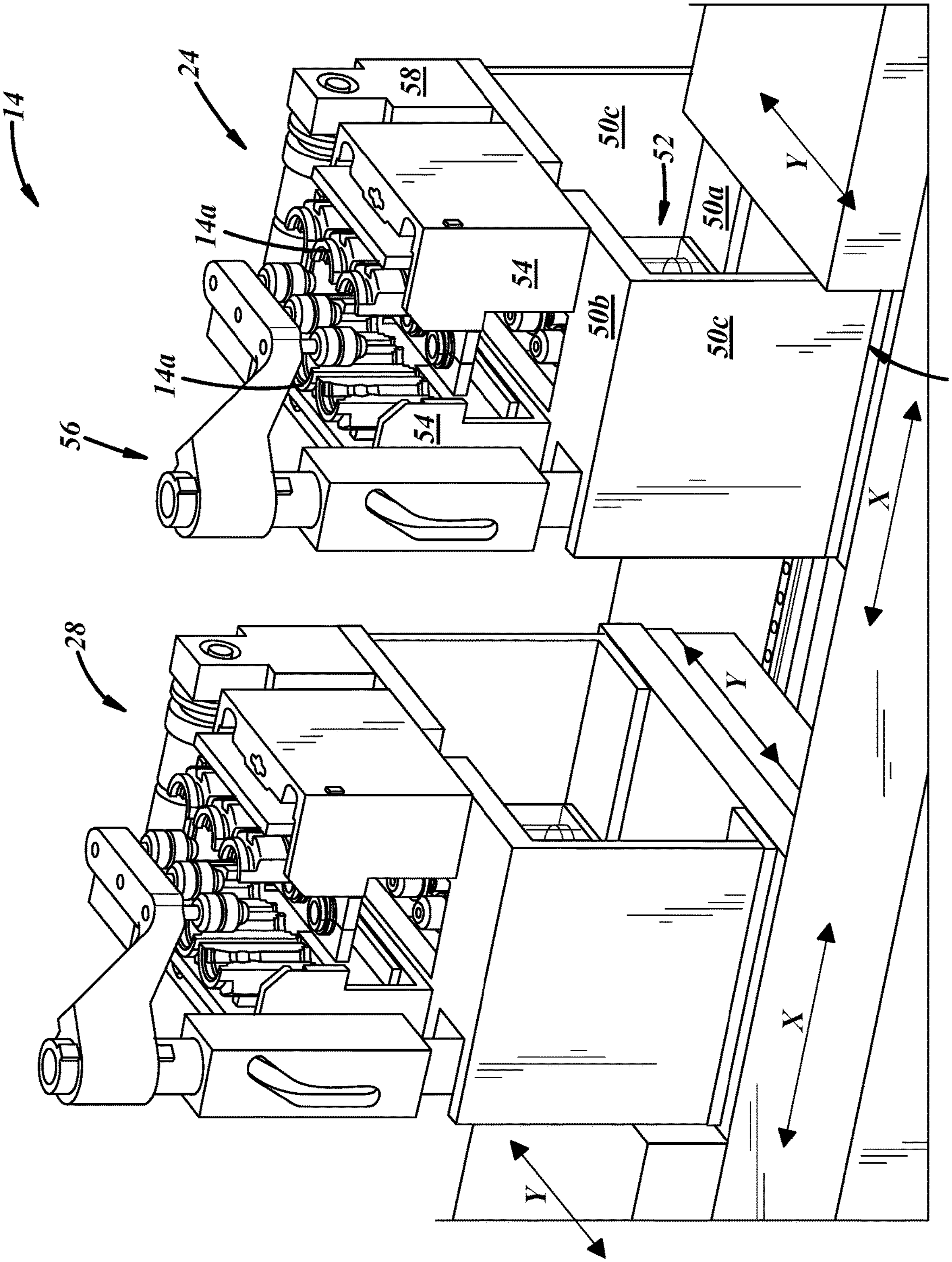
FIG. 9 shows an enlarged schematic view of both of the traversable blank sides of FIG. 4.
Figure 10:
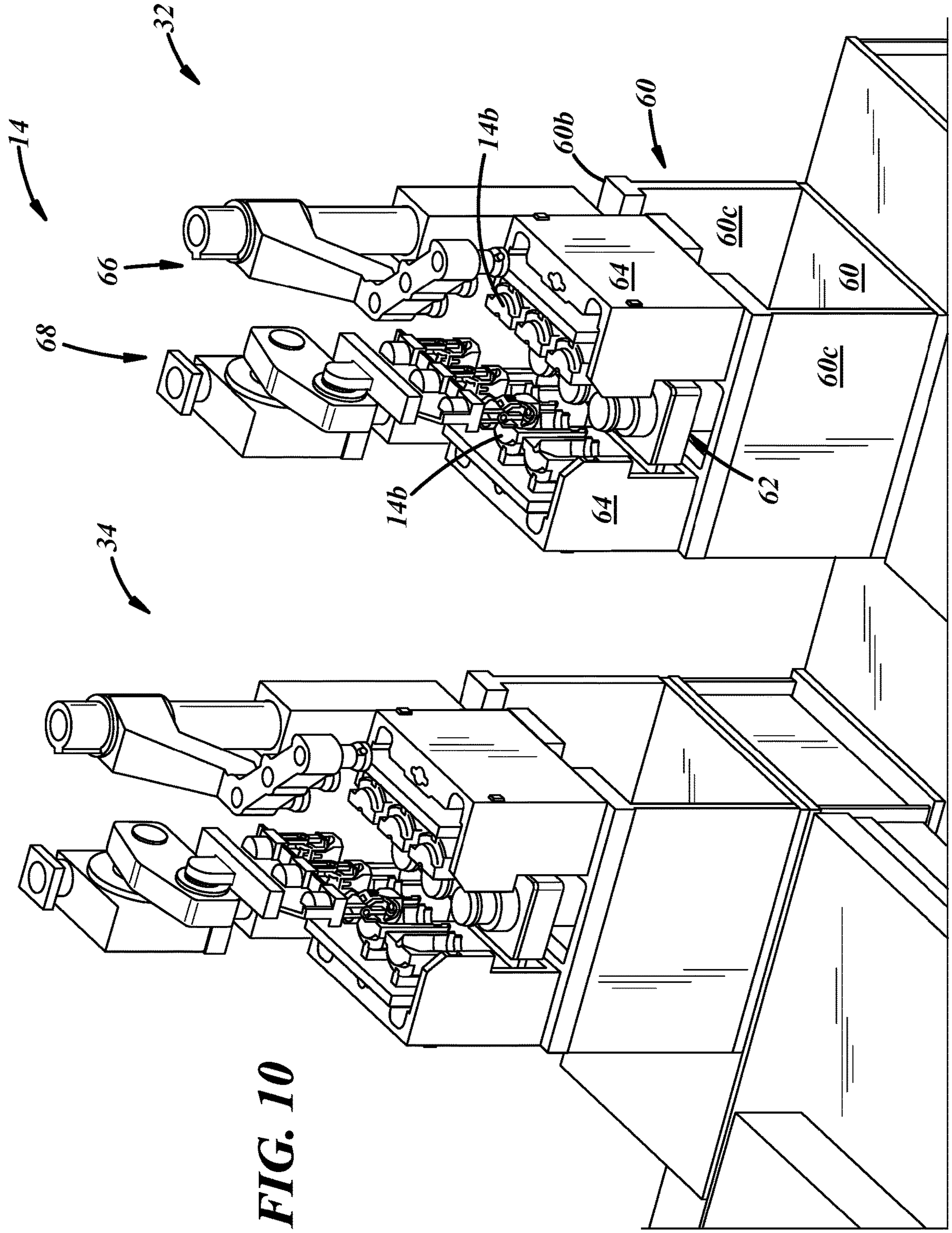
FIG. 10 shows an enlarged schematic view of both of the stationary blow sides of FIG. 4.

With reference to FIGS. 8 through 10, the blank side 24 may include a blank side frame 50 ultimately carried on the machine platen 22 and including a bottom 50*a*, a top 50*b*, and side walls 50*c* extending between the bottom 50*a* and the top 50*b*. The blank side 24 further may include a plunger apparatus 52 carried by the blank side frame 50, a blank mold holder apparatus 54 movably carried by the blank side frame 50 and, of course, the blank mold(s) 14*a*, which may be carried by the blank mold holder apparatus 54. The blank side 24 also may include a baffle apparatus 56 carried by the blank side frame 50, an inverter apparatus 58 that may be carried by the blank side frame 50, and a mold funnel apparatus (not shown) that may be carried by the frame 50. Likewise, the second blank side (FIG. 4, 28) includes the same equipment as the aforementioned blank side 24. Similarly, the stationary blow side 32 may include a blow side frame 60 including a bottom 60*a*, a top 60*b*, and side walls 60*c* extending between the bottom 60*a* and the top 60*b*. The blow side 32 further may include a bottom plate apparatus 62 (FIG. 10) carried by the blow side frame 60, a blow mold holder apparatus 64 movably carried by the blow side frame 60 and, of course, the blow mold(s) 14*b*, which may be carried by the blow mold holder apparatus 64. The stationary blow side 32 also may include a blowhead apparatus 66 carried by the blow side frame 60, and a takeout apparatus 68 carried by the blow side frame 60. Although not separately shown, each section of the IS machine 14 also includes mold cooling circuits and valves, electrical wiring and components, and any other equipment suitable for use with an IS machine, and is associated with a sweepout mechanism that sweeps finished containers from a deadplate to a downstream conveyor.

Figure 11:
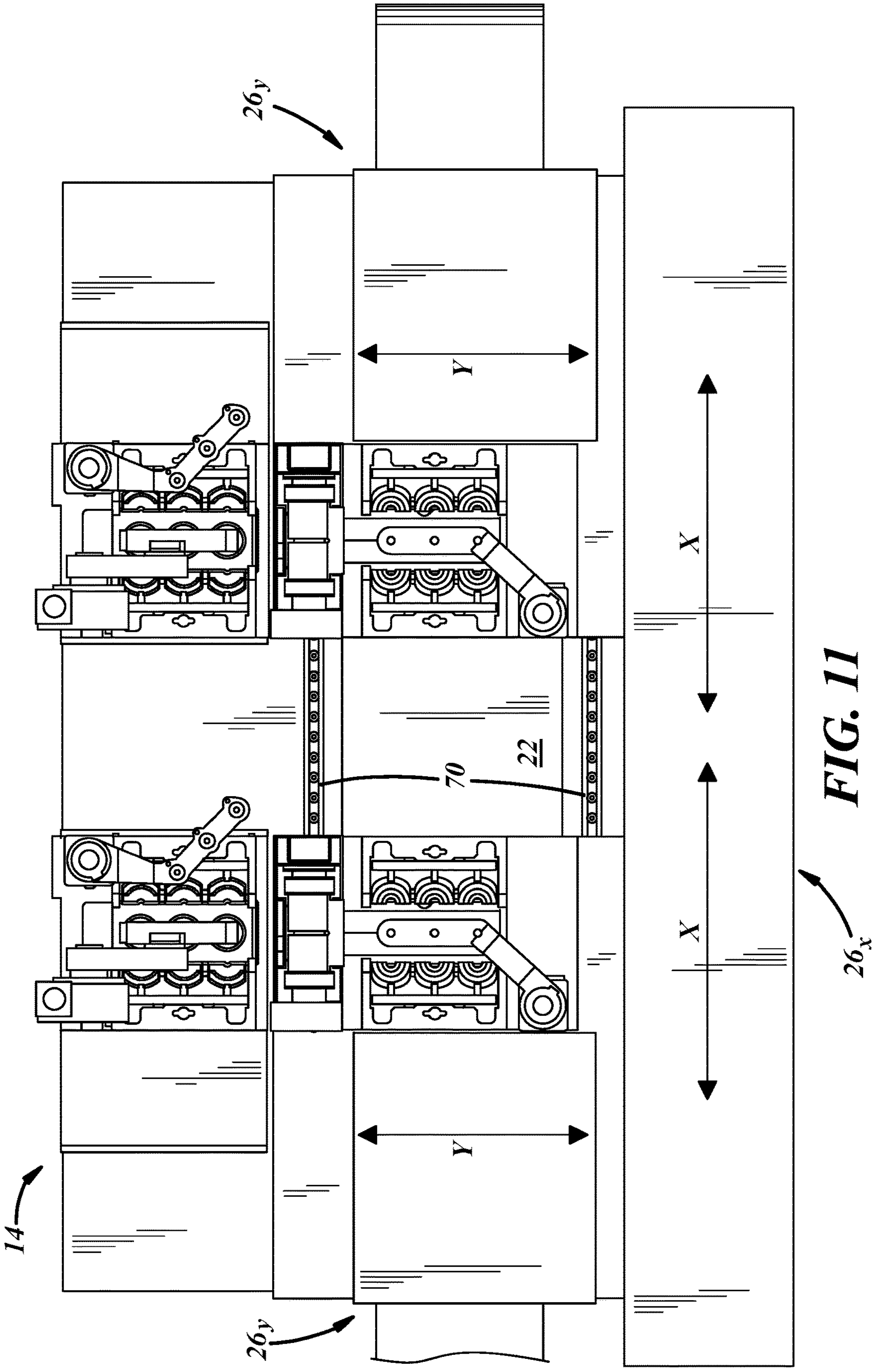
FIG. 11 shows a schematic top view of the individual section machine of FIG. 4.
Figure 12:
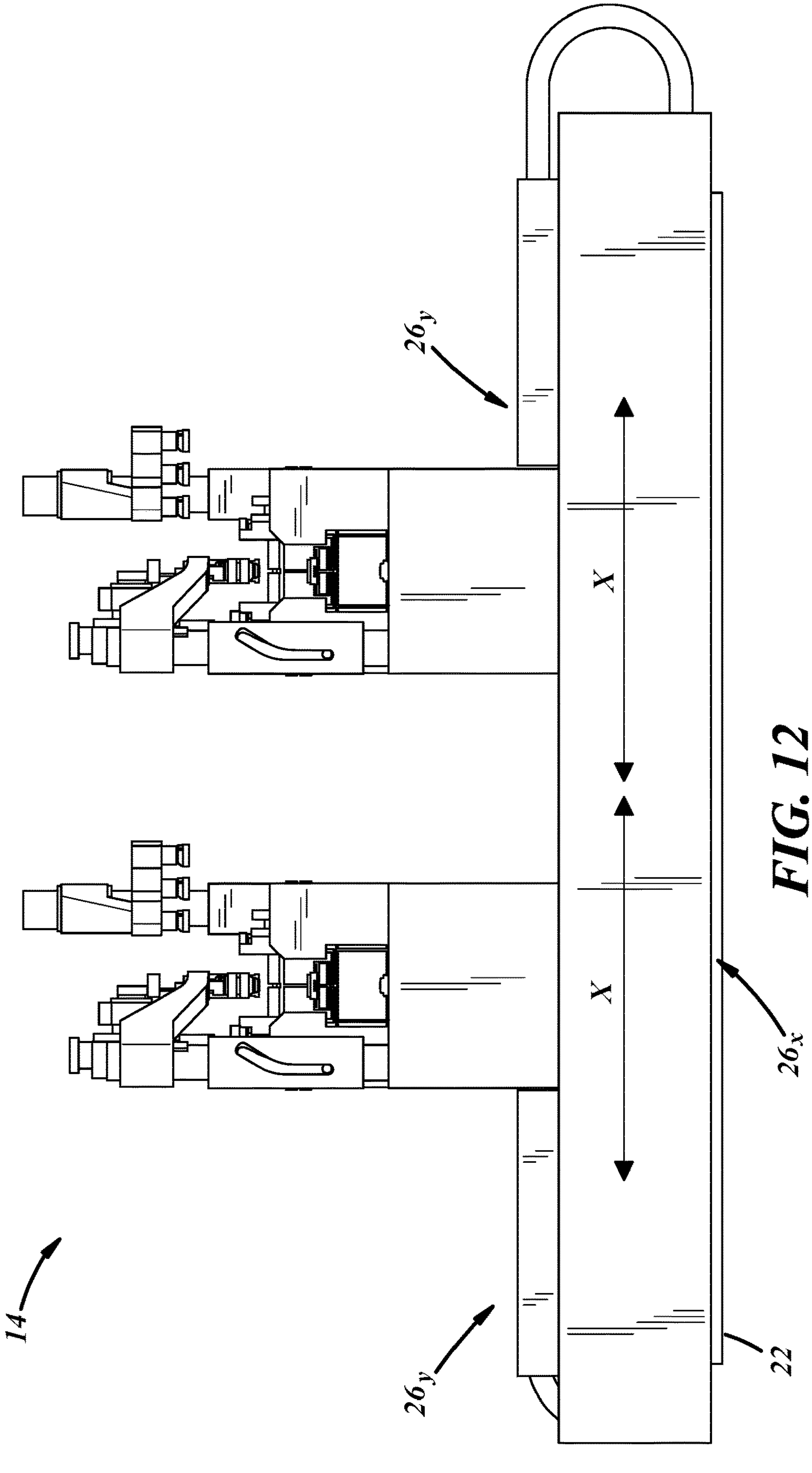
FIG. 12 shows a schematic side view of the individual section machine of FIG. 4.
Figure 13:
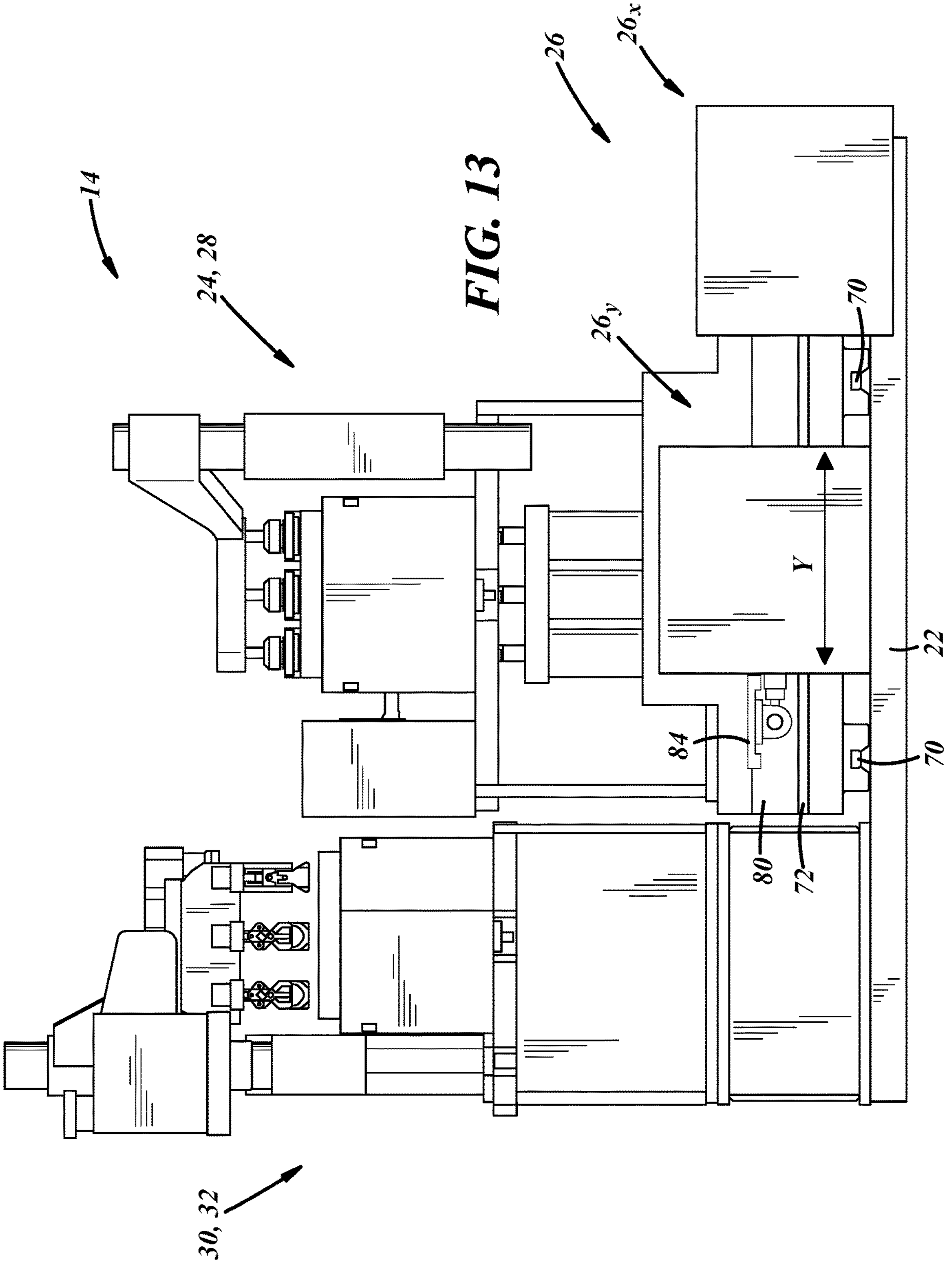
FIG. 13 shows a schematic end view of the individual section machine of FIG. 4.

With reference to FIGS. 11 through 13, the mold carriage first stage 26*x* may be carried on first stage rails 70 (FIGS. 11 and 13) fixed to the machine platen 22 and extending along the first axis X, and the mold carriage second stage 26*y* may be carried on second stage rails 72 (FIG. 13) fixed to the mold carriage first stage 26*x* and extending along the second axis Y transverse to the first axis X. As shown best in FIG. 13, the traversable blank sides 24, 28 are movably carried on the machine platen 22, whereas the stationary blank sides 30, 32 are fixed on the machine platen 22 adjacent to the traversable blank sides 24, 28.

Figure 14:
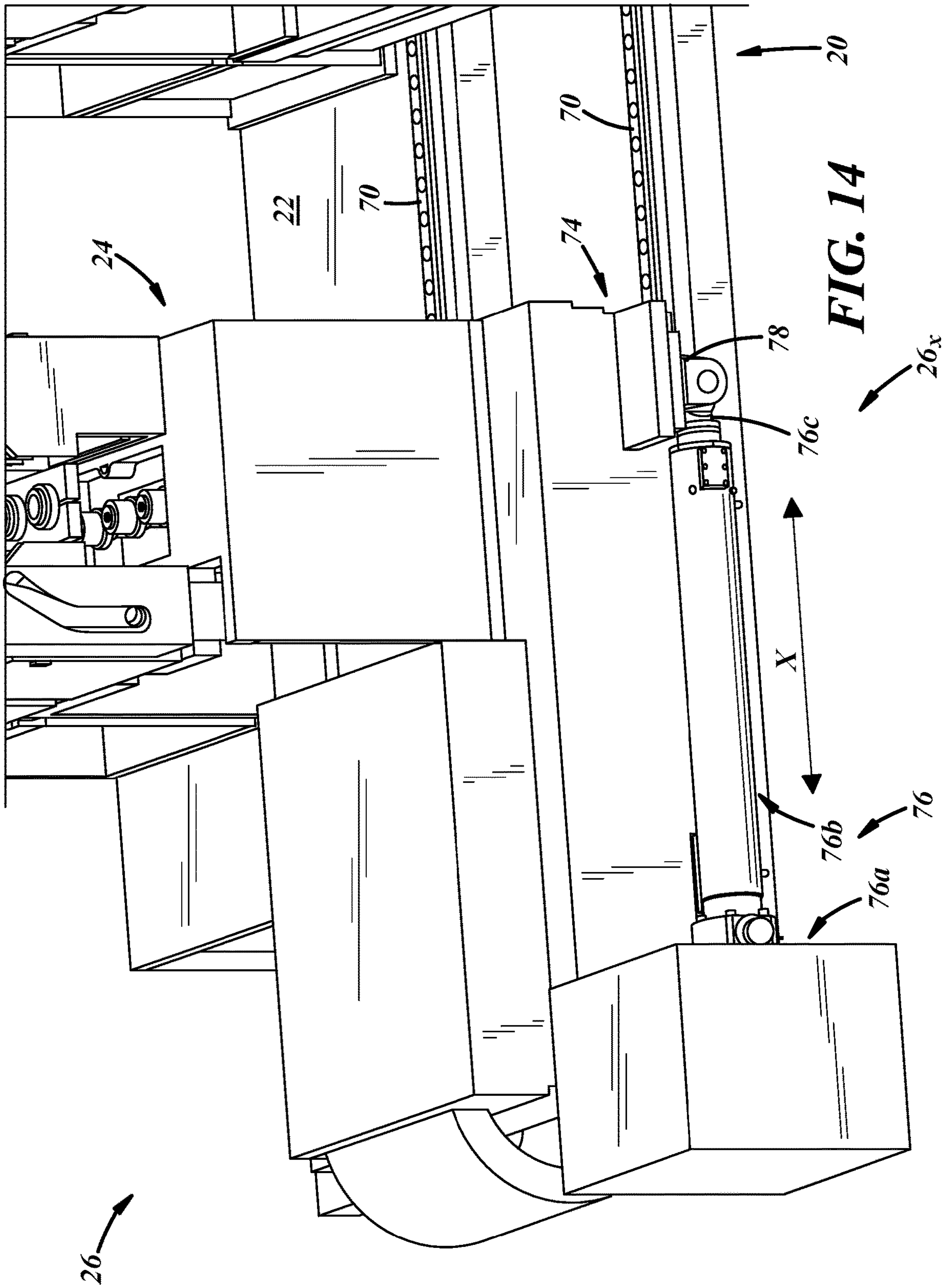
FIG. 14 shows a fragmentary schematic perspective view of a first stage actuator of the individual section machine of FIG. 4.
Figure 15:
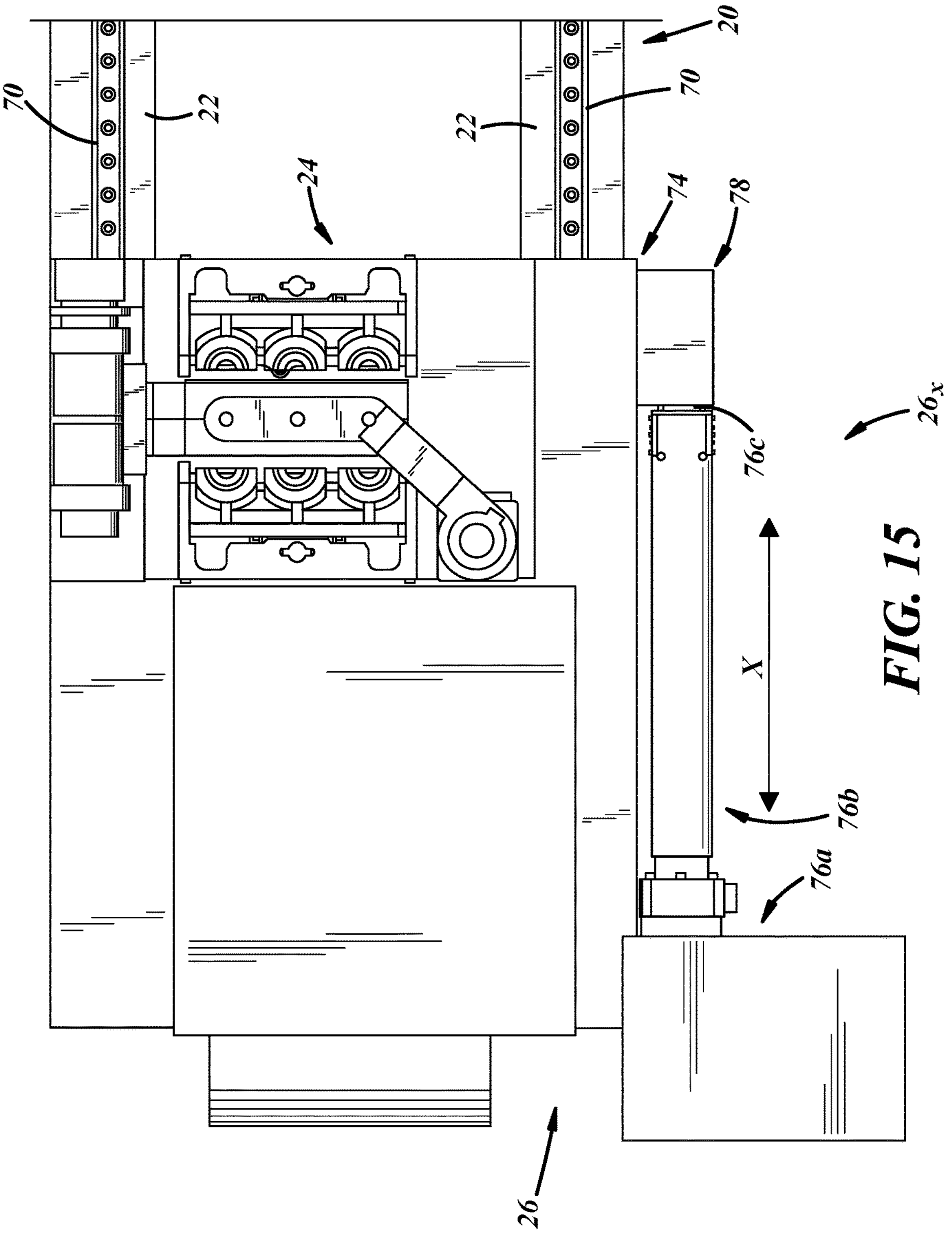
FIG. 15 shows a fragmentary schematic top view of the first stage actuator of the individual section machine of FIG. 4.

With reference to FIGS. 14 and 15, the carriage first stage 26*x* may include a first stage plate 74 and a first stage actuator 76, which may include a first stage motor 76*a* and a first stage ball screw 76*b* carried by the machine platen 22 and driven by the first stage motor 76*a* and having a first stage drive rod 76*c* coupled to a first stage extension arm 78 coupled the first stage plate 74. The carriage first stage 26*x* may include any other actuator suitable for use in a glass manufacturing environment.

Figure 16:
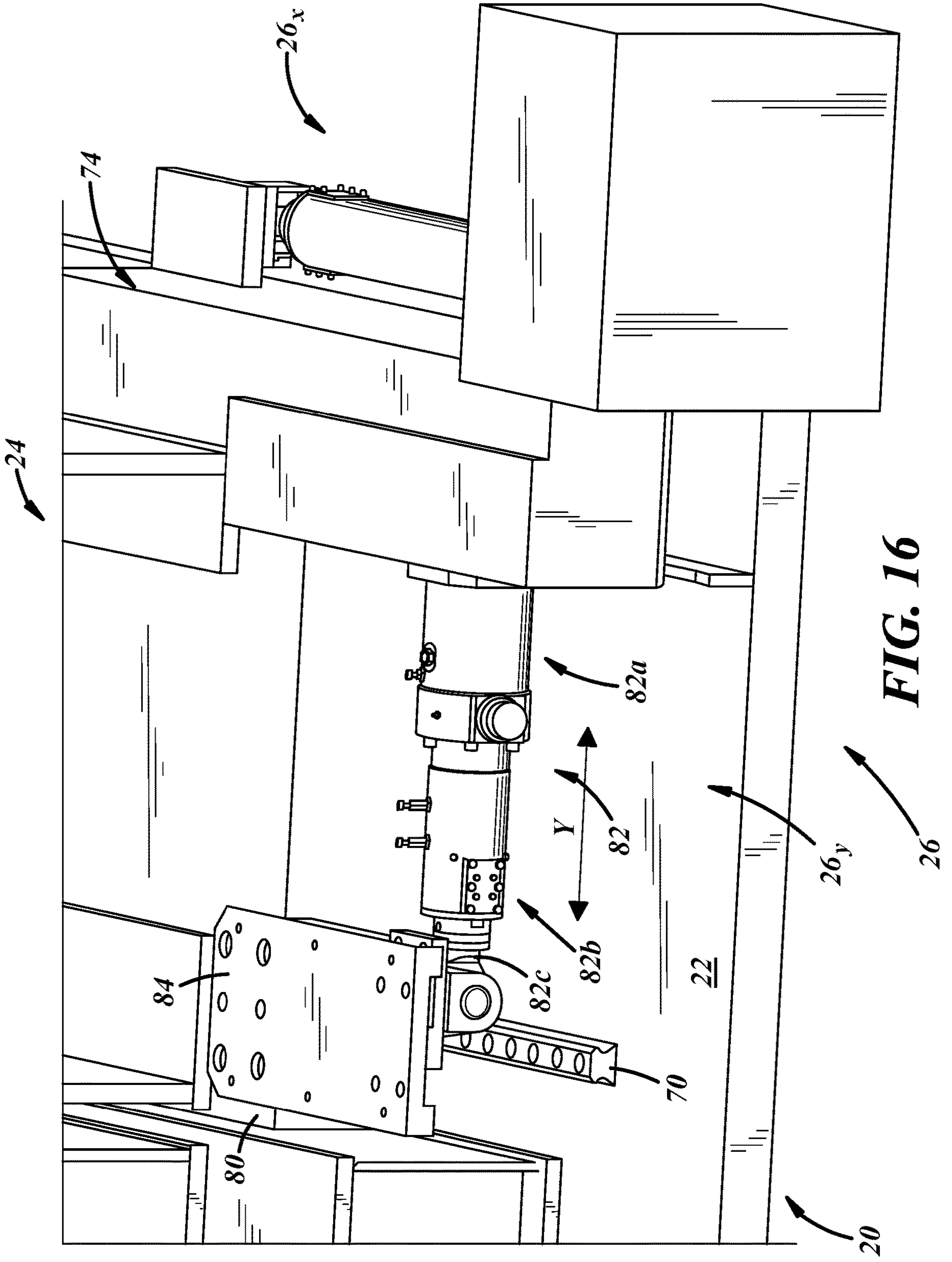
FIG. 16 shows a fragmentary schematic perspective view of a second stage actuator of the individual section machine of FIG. 4.
Figure 17:
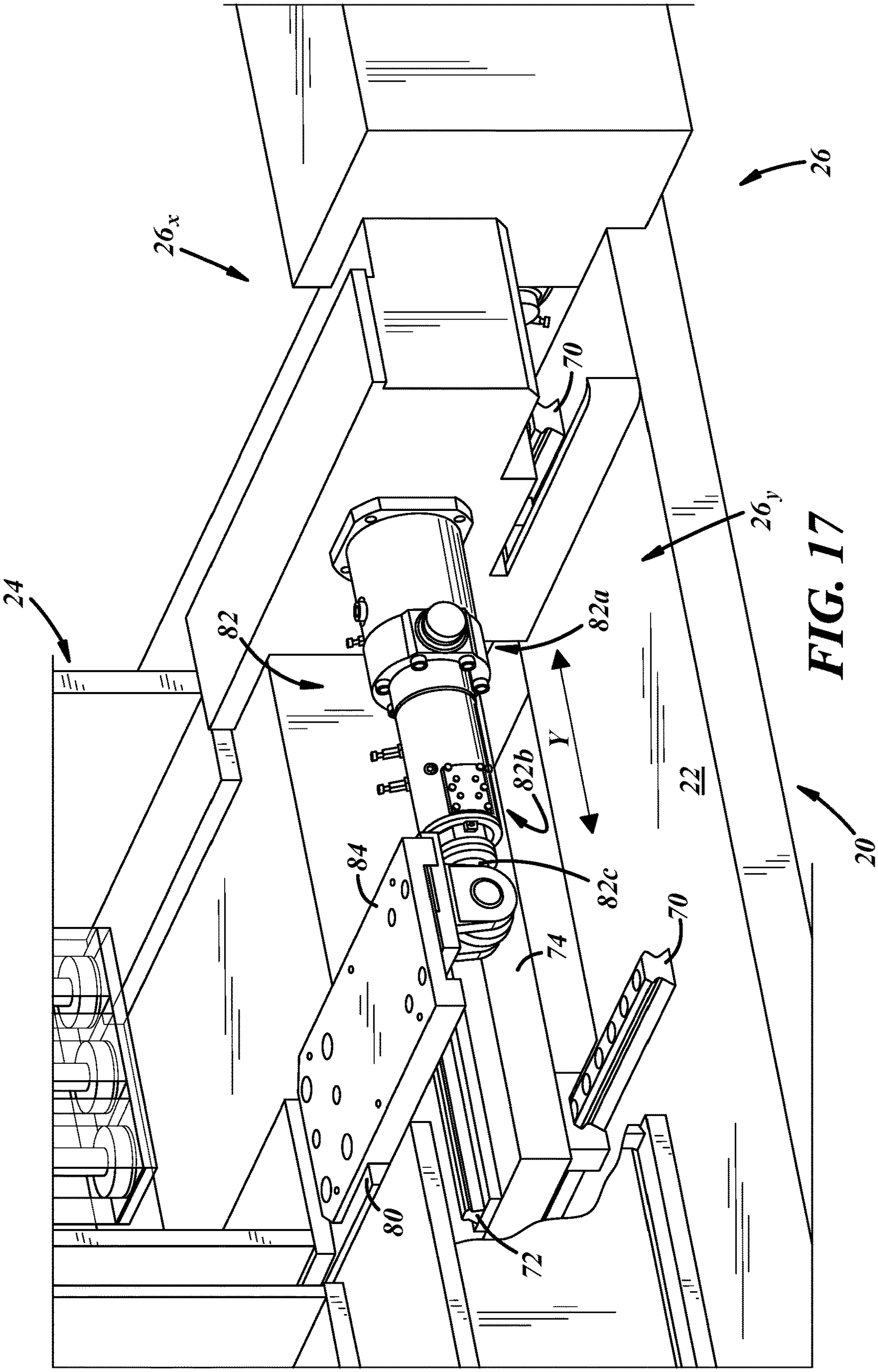
FIG. 17 shows another fragmentary schematic perspective view of the second stage actuator of the individual section machine of FIG. 4.

With reference to FIGS. 16 and 17, the carriage second stage 26*y* may include a second stage plate 80, and a second stage actuator 82, which may include a second stage motor 82*a* and a second stage ball screw 82*b* carried by the first stage plate 74 and driven by the second stage motor 82*a* and having a second stage drive rod 82*c* coupled to a second stage extension arm 84 coupled the second stage plate 80.

As such, and with reference to FIGS. 14 through 17, the illustrated mold carriage 26 includes an XY linear stage 26*x*, 26*y* that includes a lower portion movably carried on the machine frame 20 and an upper portion movably carried on the lower portion and fixed with respect to the traversable blank side 24. More specifically, the XY linear stage 26*x*, 26*y* includes the first stage plate 74 movable along the first axis X transverse to the blank mold vertical axis (FIG. 4), and the second stage plate 80 movable along the second axis Y transverse to the blank mold vertical axis (FIG. 4) and the first stage axis X.

With reference again to FIGS. 1 through 3, the sensor subsystem 16 may include the one or more falling gob sensors 16*a* to measure one or more falling gob parameters of the falling gobs G, the one more gob loading sensors 16*b*, which may include cameras, to measure one or more gob loading parameters of the glass gobs G as the gobs G are loaded into the blank mold(s) 14*a*, and/or the one or more blank or blow mold temperature sensors 16*c*, 16*d*. The sensors 16*a-d* may be carried by perimeter fencing of the IS machine 14, by overhead building girders or framework, by stand-alone sensor frames, or by any other structure suitable for use in a glass manufacturing environment. The falling gob sensors 16*a* may include one or more cameras configured and aimed to capture three-dimensional images of the glass gobs G falling from the gob feeder 12. The cameras may be used to measure gob weight, X and Y components of a falling gob angle, gob diameter, gob length, overall gob temperature, and horizontal and vertical components of gob temperature, gob velocity, and any other falling gob parameters suitable for use with the presently disclosed method. The gob loading sensors 16*b* may include one or more cameras configured and aimed to capture images of the blank mold(s) 14*a* and/or the glass gobs G as they are loaded into the blank mold(s) 14*a*. The cameras may be used to measure blank mold temperature, neck ring temperature, plunger temperature, parison temperature, gob loading position, gob arrival time, falling gob angle, gob length, and any other blank mold and/or gob loading parameters suitable for use with the presently disclosed method. The blow mold temperature sensors 16*d* may be used to measure blow mold temperature.

With continued reference to FIGS. 1 through 3 and 14 through 15 generally, the controller 18 is in communication with the one or more sensors 16*a-d* of the sensor subsystem 16 to receive sensor output signals therefrom as input signals to the controller 18, and in communication with the one or more actuators 76, 82 of the mold carriage 26 to transmit controller output signals for use as input signals to the mold carriage 26 in order to move the blank side 24, 28 responsive to the one or more falling gob parameters, the one or more gob loading parameters, or both. The controller 18 also may be in communication with the gob feeder 12 to transmit controller output signals for use as input signals to the plunger actuator, the feeder heater(s), the feeder shears actuator, or any other devices of the gob feeder 12, or any other devices of a forehearth upstream of the gob feeder 12. The controller 18 may include a single system controller, or may include multiple separate controllers in communication with one another, for instance, a gob feeder controller, a sensor controller, a mold carriage controller, and/or the like. Each controller may include memory, one or more processors coupled to the memory, and one or more interfaces coupled to the processor and that may include circuits, software, firmware, and/or any other devices to assist or enable the controller in communicating internally and/or to facilitate input and output communication with other controllers, and/or various other portions of the system 10. Of course, the controller 18 further may include any ancillary devices, for example, clocks, internal power supplies, and/or the like. Although not separately shown, the controller 18 may be supplied with electricity by an external power supply, for example, an AC to DC transformer, one or more batteries, fuel cells, and/or the like. In any case, the controller 18 may be used to facilitate various aspects of the presently disclosed method discussed below.

A method of loading a blank mold of an individual section machine includes producing a falling glass gob along a falling gob axis, moving at least one traversable blank side including at least one blank mold along an axis transverse to the falling gob axis to load the glass gob substantially along a first loading axis of the at least one blank mold, and forming the glass gob into a parison using the at least one blank mold. The moving step may include moving first and second traversable blank sides with respect to the falling gob axis to load the glass gobs substantially along first and second loading axes of first and second blank molds of the first and second traversable blank sides. More specifically, the moving step may include actuating a mold carriage carried on a machine frame and operatively coupled to the first and second traversable blank sides to move the first and second traversable blank sides relative to the machine frame during operation of the machine. The method also may include sensing a characteristic of the falling gob and/or of the gob loading, and, responsive to the sensing step, adjusting at least one of the gob producing step or the blank side moving step. More specifically, the controller may receive and process input signals corresponding to one or more characteristics discussed above that are sensed by the sensor subsystem, and produce output signals to one or more portions of the gob feeder and/or the mold carriage to improve gob loading precision and/or accuracy.

The system may be set up initially and then run autonomously. For example, one or more humans may secure the IS machine to a factory floor, for instance, by fastening the base to a forming floor, projecting a laser or other plumb or alignment device between centerlines of the gob feeder orifices and centerlines of corresponding blank molds, adjusting the levelers and the positioners to achieve desired alignment between the corresponding centerlines, and fastening the IS machine in place. Thereafter, because the system and method may be configured for closed loop control of movement of the blank sides and also may be configured for closed loop control of the gob feeder, the system may be operated autonomously. For example, the actual gob loading position of the gobs can be measured relative to a desired gob loading position, and precision and accuracy of the actual gob loading may be evaluated and action may be taken based on such evaluation. For example, when the actual loading position drifts too far from the desired loading position, the controller can transmit one or more suitable output signals to adjust a loading position of the blank side along the X and/or Y axes and thus maintain desirable loading for every gob loaded. Likewise, when the actual loading position drifts too far from the desired loading position, the controller can transmit one or more suitable output signals to adjust various parameters of the gob feeder, for instance, gobbing rate, feeder temperature(s), and the like. Therefore, once the system is initially configured and aligned by one or more humans, thereafter, the system can self-correct to ensure desirable gob loading precision and accuracy in blank molds from mold cycle to mold cycle.

As used in herein, the terminology "for example," "e.g.," for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A glass forming individual section machine, comprising:

a machine frame having a glass gob loading axis;

a first traversable blank side, including a first blank mold configured to form a glass gob into a first parison and having a first blank mold vertical axis, and being disposed on a first side of the glass gob loading axis;

a mold carriage movably carried on the machine frame and coupled to the first traversable blank side to linearly translate the first traversable blank side from the first side of the glass gob loading axis toward the glass gob loading axis to align the first blank mold vertical axis with the glass gob loading axis and to linearly translate the first traversable blank side away from the glass gob loading axis; and a second traversable blank side including a second blank mold configured to form a glass gob into a parison, having a second blank mold vertical axis, and being disposed on a second side of the glass gob loading axis, wherein the second traversable blank side is movable from the second side of the glass gob loading axis toward the glass gob loading axis to align the second blank mold vertical axis with the glass gob loading axis.

2. The machine of claim 1, wherein the mold carriage includes an XY linear stage that includes a lower portion movably carried on the machine frame and an upper portion movably carried on the lower portion and fixed with respect to the first traversable blank side.

3. The machine of claim 2, wherein the XY linear stage include a first plate movable along a first axis transverse to the first blank mold vertical axis, and a second plate movable along a second axis transverse to the first blank mold vertical axis and the first axis.

4. The machine of claim 1, further comprising:

a second mold carriage carried on the machine frame and coupled to the second traversable blank side to linearly translate the second traversable blank side toward the glass gob loading axis to align the second blank mold vertical axis with the glass gob loading axis and to linearly translate the second traversable blank side away from the glass gob loading axis.

5. The machine of claim 4, further comprising:

first and second stationary blow sides fixed with respect to the machine frame and spaced laterally apart from the first and second traversable blank sides; and parison inverters to invert parisons produced by the first and second traversable blank sides from the first and second traversable blank sides to the first and second stationary blow sides.

6. The machine of claim 1, wherein the first traversable blank side also includes:

a blank side frame including a bottom, a top, and side walls extending between the bottom and the top;

a plunger apparatus carried by the blank side frame;

a blank mold holder apparatus movably carried by the blank side frame;

the first blank mold carried by the blank mold holder apparatus;

a baffle apparatus carried by the blank side frame; and an inverter apparatus carried by the blank side frame.

7. The machine of claim 1, further comprising:

a stationary blow side fixed with respect to the machine frame and having a blow mold with a blow mold vertical axis laterally offset from the first blank mold vertical axis.

8. The machine of claim 7, further comprising:

an inverter apparatus having an inverter axis positioned between the first blank mold and the blow mold.

9. The machine of claim 7, wherein the stationary blow side includes:

a blow side frame including a bottom, a top, and side walls extending between the bottom and the top;

a bottom plate apparatus carried by the blow side frame;

a blow mold holder apparatus movably carried by the blow side frame;

the blow mold carried by the blow mold holder apparatus;

a blowhead apparatus carried by the blow side frame; and a takeout apparatus carried by the blow side frame.

10. The machine of claim 1, wherein the first and second blank molds are configured to receive glass gobs along their respective blank mold vertical axes directly from a gob feeder.

11. The machine of claim 1, wherein the machine frame includes:

a base;

a machine platen; and adapter mounts coupled to the base and carrying the machine platen.

12. The machine of claim 11, wherein the base includes a plurality of beams extending longitudinally and being laterally spaced apart from one another and a plurality of cross-members extending laterally between and connecting to the plurality of beams.

13. The machine of claim 11, wherein the mold carriage includes:

a carriage first stage carried on rails fixed to the machine platen and extending along a first axis; and a carriage second stage carried on rails fixed to the carriage first stage and extending along a second axis transverse to the first axis.

14. A glass manufacturing system, comprising:

a gob feeder to produce falling gobs that fall along the glass gob loading axis; and the machine of claim 1, wherein the first and second traversable blank sides are movable below the gob feeder so that the first and second blank molds receive the falling gobs directly from the gob feeder.

15. The glass manufacturing system of claim 14, including no gob delivery equipment between the gob feeder and the first and second blank molds to change direction of the falling gobs.

16. The glass manufacturing system of claim 14, further comprising:

at least one of a falling gob camera to measure one or more falling gob parameters of the falling gobs, or a gob loading camera to measure one or more gob loading parameters of the falling gobs as they are being loaded into the first and second blank molds; and a controller to move the first and second blank molds responsive to at least one of the one or more falling gob parameters or the one or more gob loading parameters.

17. A glass forming individual section machine, comprising:

a machine frame having a glass gob loading axis;

a first traversable blank side, including a first blank mold configured to form a glass gob into a parison and having a first blank mold vertical axis, and being disposed on a first side of the glass gob loading axis;

a mold carriage movably carried on the machine frame and coupled to the first traversable blank side to linearly translate the first traversable blank side toward the glass gob loading axis to align the first blank mold vertical axis with the glass gob loading axis and to linearly translate the first traversable blank side away from the glass gob loading axis;

a second traversable blank side including a second blank mold configured to form a glass gob into a parison, having a second blank mold vertical axis, and being disposed on a second side of the glass gob loading axis, wherein the second traversable blank side is movable from the second side of the glass gob loading axis toward the glass gob loading axis to align the second blank mold vertical axis with the glass gob loading axis;

wherein the first and second blank molds are configured to receive glass gobs along their respective blank mold vertical axes directly from a gob feeder;

a controller in operative communication with the mold carriage to control movement of the mold carriage; and at least one sensor configured to sense the glass gob falling along the axis and produce output signals used as input to the controller in controlling movement of the mold carriage.

18. A glass forming individual section machine, comprising:

a machine frame having a glass gob loading axis, and including a base that includes a plurality of beams extending longitudinally and being laterally spaced apart from one another, and a plurality of cross-members extending laterally between and connecting to the plurality of beams, a machine platen, and adapter mounts coupled to the base and carrying the machine platen, wherein the adapter mounts include positioners including set screws to move the machine platen relative to the base in a plurality of directions;

a traversable blank side, including a blank mold configured to form a glass gob into a parison and having a blank mold vertical axis; and a mold carriage movably carried on the machine frame and coupled to the traversable blank side to linearly translate the traversable blank side toward the glass gob loading axis to align the blank mold vertical axis with the glass gob loading axis and to linearly translate the traversable blank side away from the glass gob loading axis.

19. A glass forming individual section machine, comprising:

a machine frame having a glass gob loading axis, and including a base that includes a plurality of beams extending longitudinally and being laterally spaced apart from one another, and a plurality of cross-members extending laterally between and connecting to the plurality of beams, a machine platen, and adapter mounts coupled to the base and carrying the machine platen, a traversable blank side, including a blank mold configured to form a glass gob into a parison and having a blank mold vertical axis;

a mold carriage movably carried on the machine frame and coupled to the traversable blank side to linearly translate the traversable blank side toward the glass gob loading axis to align the blank mold vertical axis with the glass gob loading axis and to linearly translate the traversable blank side away from the glass gob loading axis, wherein the mold carriage includes:

a carriage first stage carried on rails fixed to the machine platen and extending along a first axis, and a carriage second stage carried on rails fixed to the carriage first stage and extending along a second axis transverse to the first axis, wherein the carriage first stage includes a first stage plate and the carriage second stage includes a second stage plate, and the machine further comprises:

a second stage actuator including a second stage motor and a second stage ball screw carried by the first stage plate and driven by the second stage motor and having a second stage drive rod coupled to a second stage extension arm coupled the second stage plate; and a first stage actuator including a first stage motor and a first stage ball screw carried by the machine platen and driven by the first stage motor and having a first stage drive rod coupled to a first stage extension arm coupled the first stage plate.

20. The machine of claim 19, wherein the carriage first stage also includes another first stage motor and another first stage ball screw carried by the machine platen and driven by the other first stage motor and having another first stage drive rod.

21. A glass forming individual section machine, comprising:

a machine frame having a glass gob loading axis;

a traversable blank side, including a blank side frame, a plunger apparatus carried by the blank side frame, a blank mold holder apparatus movably carried by the blank side frame, and a blank mold carried by the blank mold holder apparatus and configured to form a glass gob into a parison and having a blank mold vertical axis; and a mold carriage movably carried on the machine frame and coupled to the traversable blank side to linearly translate the traversable blank side toward the glass gob loading axis to align the blank mold vertical axis with the glass gob loading axis and to linearly translate the traversable blank side away from the glass gob loading axis, wherein the mold carriage is movable along a first axis, and a second axis transverse to the first axis, wherein the mold carriage is configured to move along the first and second axes to load the glass gob into the blank mold.

22. A glass forming individual section machine, comprising:

a machine frame having a glass gob loading axis;

a traversable blank side, including a blank mold configured to form a glass gob into a parison and having a blank mold vertical axis;

a mold carriage movably carried on the machine frame and coupled to the traversable blank side to linearly translate the traversable blank side toward the glass gob loading axis to align the blank mold vertical axis with the glass gob loading axis and to linearly translate the traversable blank side away from the glass gob loading axis, wherein the mold carriage is movable along a first axis, and a second axis transverse to the first axis, wherein the mold carriage is configured to move along the first and second axes to load the glass gob into the blank mold;

at least one sensor to measure at least one of a gob loading parameter or a falling gob parameter and produce at least one output signal; and a controller in operative communication with the mold carriage to control movement of the mold carriage along the first axis and/or the second axis to improve gob loading, responsive to the at least one output signal from the at least one sensor.

23. A glass container manufacturing system, comprising:

the glass forming individual section machine of claim 22; and a glass gob feeder, wherein the controller is also in operative communication with the glass gob feeder to control one or more portions of the glass gob feeder to improve gob loading.

* * * * *